J. W. SMITH.
CHURN.

No. 186,501. Patented Jan. 23, 1877.

WITNESSES:
E. Wolff
J. H. Scarborough

INVENTOR:
James W. Smith
BY
Munn & Co.
ATTORNEYS.

UNITED STATES PATENT OFFICE.

JAMES W. SMITH, OF HUMANSVILLE, MISSOURI.

IMPROVEMENT IN CHURNS.

Specification forming part of Letters Patent No. 186,501, dated January 23, 1877; application filed October 7, 1876.

*To all whom it may concern:*

Figure 1:
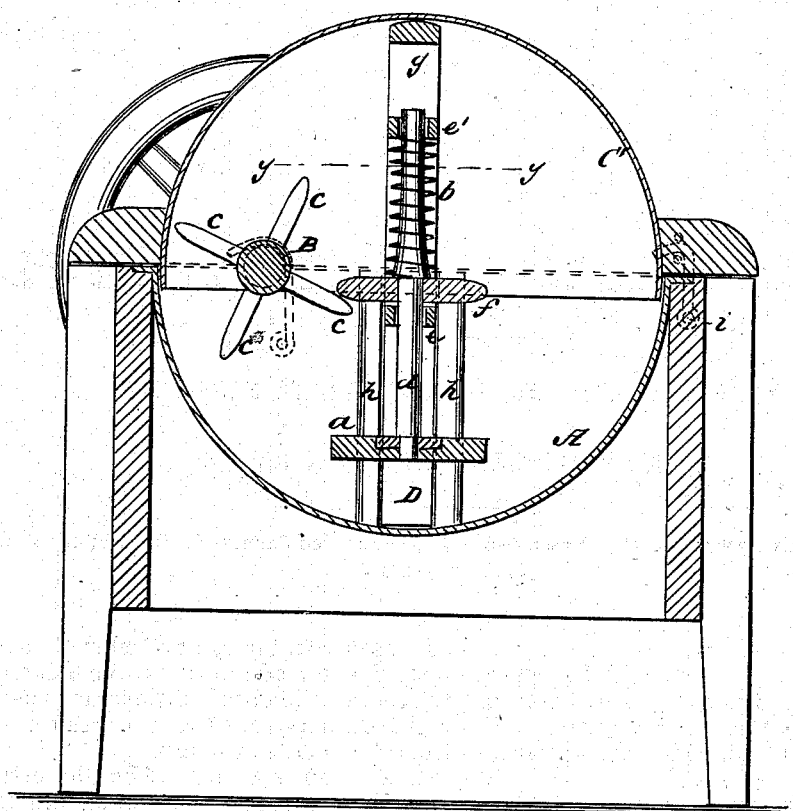
Figure 2:
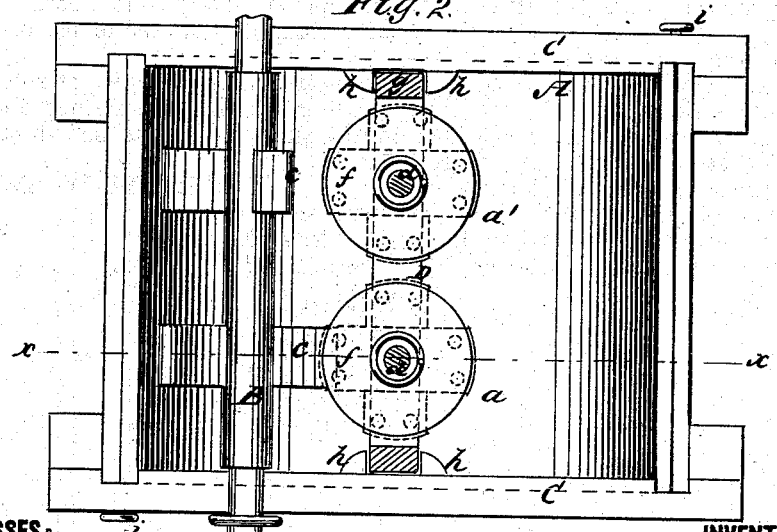

Be it known that I, JAMES W. SMITH, of Humansville, Polk county, in the State of Missouri, have invented an Improvement in Churns, of which the following is a specification:

Figure 1 of the drawing is a transverse section, and Fig. 2 a plan view with the cover removed.

A represents the cream-receptacle; B, a shaft, journaled in end pieces C; and D D, dashers that reciprocate vertically. On the shaft B are secured the rotary dasher-arms $c$ $c$, that are arranged to strike alternately the disks $f f$ of the dasher-rods $d$ $d$, so as to alternately lift them against the springs $b$ $b$.

The operation is as follows: The cream having been poured into the receptacle and the cover secured, the rotary dasher B $c$ $c$ is set in motion, and made to throw the cream toward the center, while its arms operate the reciprocating dashers, that force the cream outwardly from the middle of churn.

The butter is brought from the cream in a very short time, in a very thorough manner, and with comparatively little labor.

What I claim as new and of my invention is—

The combination, in a churn, of rotary and reciprocating dashers, the former operating the latter, substantially as shown and described.

JAMES W. SMITH.

Witnesses:
 JAMES L. MARTIN,
 WILLIAM M. MARTIN.